United States Patent
Kreisel et al.

(10) Patent No.: US 10,483,606 B2
(45) Date of Patent: Nov. 19, 2019

(54) TEMPERATURE-CONTROL DEVICE FOR A BATTERY SYSTEM

(71) Applicant: Kreisel Electric GmbH & Co. KG, Rainbach im Mühlkreis (AT)

(72) Inventors: Phillip Kreisel, Freistadt (AT); Johann Kreisel, Jr., Freistadt (AT); Markus Kreisel, Freistadt (AT)

(73) Assignee: Raiffeisenlandesbank Oberösterreich AG, Linz (AT)

( * ) Notice: Subject to any disclaimer, the term of this patent is extended or adjusted under 35 U.S.C. 154(b) by 0 days.

(21) Appl. No.: 15/769,064

(22) PCT Filed: Oct. 18, 2016

(86) PCT No.: PCT/EP2016/074969
§ 371 (c)(1),
(2) Date: Apr. 17, 2018

(87) PCT Pub. No.: WO2017/067923
PCT Pub. Date: Apr. 27, 2017

(65) Prior Publication Data
US 2018/0316074 A1    Nov. 1, 2018

(30) Foreign Application Priority Data
Oct. 18, 2015 (DE) .................. 10 2015 013 377

(51) Int. Cl.
| | | |
|---|---|---|
| *H01M 10/50* | (2006.01) | |
| *H01M 10/6568* | (2014.01) | |
| *H01M 2/10* | (2006.01) | |
| *H01M 10/625* | (2014.01) | |
| *H01M 10/6567* | (2014.01) | |
| *H01M 10/643* | (2014.01) | |
| *H01M 10/617* | (2014.01) | |
| *H01M 10/613* | (2014.01) | |

(52) U.S. Cl.
CPC ..... *H01M 10/6568* (2015.04); *H01M 2/1077* (2013.01); *H01M 10/613* (2015.04); *H01M 10/617* (2015.04); *H01M 10/625* (2015.04); *H01M 10/643* (2015.04); *H01M 10/6567* (2015.04)

(58) Field of Classification Search
CPC ......... H01M 10/6568; H01M 10/6567; H01M 10/613; H01M 10/617; H01M 10/625; H01M 10/643; H01M 2/1077
See application file for complete search history.

(56) References Cited

U.S. PATENT DOCUMENTS

| | | | |
|---|---|---|---|
| 2014/0134469 A1* | 5/2014 | Damon | H01M 2/1077 429/120 |
| 2015/0114617 A1* | 4/2015 | Yang | F28F 3/048 165/287 |
| 2015/0210184 A1 | 7/2015 | Sun et al. | |
| 2015/0357688 A1* | 12/2015 | Heeg | H01M 10/625 429/120 |
| 2016/0172727 A1 | 6/2016 | Chan et al. | |

FOREIGN PATENT DOCUMENTS

| | | |
|---|---|---|
| DE | 10 2011 017375 A1 | 1/2012 |
| DE | 10 2011 082 991 A1 | 3/2013 |
| DE | 10 2014 205 133 A1 | 9/2015 |
| DE | 10 2014 112 628 A1 | 3/2016 |
| WO | 201041387 A1 | 3/2013 |
| WO | 2013041387 A1 | 3/2013 |
| WO | 2016099606 A1 | 6/2016 |

OTHER PUBLICATIONS

Espacenet. English Language Translation of DE 10 2011 017375, Magna E Car Systems GmbH & Co., Jan. 26, 2012.
Behr Hella Service GmbH, Schwäbisch Hall, "Thermal Management in Hybrid Vehicles".

* cited by examiner

*Primary Examiner* — Raymond Alejandro
(74) *Attorney, Agent, or Firm* — Tiajoloff & Kelly LLP

(57) ABSTRACT

The invention relates to a temperature-control device (1) for a battery system, at least comprising a cuboid-shaped hollow body (2) with at least one connection device (3) for supplying and at least one connection device (4) for discharging a separately temperature-controlled fluid, a plurality of regularly arranged and identically formed openings (7) extending from a first body surface (5) to a second body surface (6), wherein a cylindrical battery cell (8) is accommodated by each opening (7), so that a fluid-tight liquid space is formed, which is characterized in that the hollow body (2), excluding the cell head (11) and the cell bottom (12), extends over a height h of >20 to <100% of the total height H of the battery system.

9 Claims, 2 Drawing Sheets ary management. This is especially true for extreme power ranges, i.e. at a high power output or a high power consumption of the battery cell and at very high ambient temperatures.

TEMPERATURE-CONTROL DEVICE FOR A BATTERY SYSTEM

FIELD OF THE INVENTION

The present invention relates to a temperature-control device for a battery system, having a cuboid-shaped hollow body with at least one connection device for supplying and at least one connection device for discharging a separately temperature-controlled fluid, a plurality of regularly arranged and identically formed openings extending from a first body surface to a second body surface, wherein a cylindrical battery cell is accommodated by each opening, so that a fluid-tight liquid space is formed.

Battery systems, or a combination of several battery systems, partly also referred to as a battery pack, are used in mobile applications, such as electric vehicles or hybrid vehicles, as a rechargeable electrical energy storage unit, e.g. with lithium-ion batteries, lithium polymer batteries or nickel-metal hybrid batteries. Lithium-ion high-voltage batteries are sometimes used in all-electric drives to further reduce the size and weight of the battery system, among other things.

Generic battery systems must be operated in a specific temperature window. The flow of electrochemical processes in a battery is significantly affected by the operating conditions of the battery and the temperature. Higher temperatures improve electron or ion mobility but reduce the internal impedance of the battery cell and increase its capacity. Higher temperatures, however, can also cause unwanted or irreversible chemical reactions and/or loss of the electrolyte, which can cause permanent damage or complete failure of the battery. Repeated temperature changes can also damage the battery.

From an operating temperature of +40° C., the operational lifespan is reduced, while below −10° C., the efficiency and performance decrease. In addition, the temperature difference between the individual cells must not exceed 5 to 10 K. Short-term peak loads in conjunction with high currents such as recuperation or boosting lead to considerable heating of the cells. In addition, high outside temperatures, for example in the summer months, can help the temperature in the battery system reach a critical level.

DESCRIPTION OF THE PRIOR ART

From US 2015 210 184 A1 an air-cooled battery pack is known. The battery pack includes a plurality of battery cells arranged in a plurality of modules such that cooling channels are defined between adjacent cells in each of the modules.

From DE 10 2011 082 991 A1, a battery is known with a battery housing, temperature-control elements and a lithium-ion cell, which is in direct contact with one of the temperature-control elements.

Furthermore, a battery pack with a number of battery modules with battery cells and at least one temperature-control device is known from DE 10 2014 205 133 A1, which is characterized in that the battery cells are coupled to the at least one temperature-control device by a material with temperature-dependent thermal conductivity.

Further possibilities for the temperature control of generic battery systems known from the prior art are, for example, to aspirate air from the air-conditioned vehicle interior, to connect a special evaporator plate enclosed in the battery cell to the existing air conditioning system in the vehicle, or to allow a flow of coolant through a cooling plate built into a battery block (see Behr/Hella "Thermal Management in Hybrid Vehicles", BEHR HELLA SERVICE GmbH, Schwäbisch Hall).

All of the cooling concepts known from the prior art lack a fast and, in particular, uniform removal of the resulting heat, in particular an optimized temperature management. This is especially true for extreme power ranges, i.e. at a high power output or a high power consumption of the battery cell and at very high ambient temperatures.

Also, the problem of thermal imbalance in the cell network, which leads to different power densities and thus in turn to a thermal imbalance within a battery block (self-damaging system) is not solved satisfactorily.

SUMMARY OF THE INVENTION

It is the object of the present invention to provide an improved, but at least alternative, temperature-control device for a battery system. In particular, it is an object of the invention to ensure thermal equilibrium within a battery system.

According to the invention, a temperature-control device for a battery system is proposed which comprises at least one cuboid-shaped hollow body having at least one connection device for supplying and at least one connection device for discharging a separately temperature-controlled fluid, the cuboid-shaped hollow body has a plurality of regularly arranged and identically formed openings which extend from a first body surface to a second body surface, wherein a cylindrical battery cell is accommodated by each opening, so that a fluid-tight liquid space is formed.

It is essential to the invention that the hollow body, excluding the cell head and the cell bottom, extends over a height h of >20 to <100% of the total height of the battery system. The battery cells are lapped in the liquid space by the separately temperature-controlled fluid. This direct, full-area contact of each cylindrical battery cell of the battery system with the temperature-controlled fluid allows the system to be kept active within an optimal operating temperature range.

Thus, it is not only possible by the present invention to quickly dissipate heat generated at the cell jacket of the battery cells, but also to avoid a thermal imbalance in the battery cell assembly.

In order to ensure a fluid-tight liquid space, it is preferable to provide a sealing element which encloses the cylindrical battery cells. Such a sealing element may, for example, be a sealing ring formed on each of the openings, which closes off the cells in a sealing manner over the circumference at the upper and lower cell jacket positions. Preferably, however, the sealing elements are integrally formed sealing plates, comprising openings corresponding to those of the cuboid-shaped hollow body.

These sealing plates are produced in one piece, for example made of a TPE, EPDM or another elastomeric, preferably thermoplastic, synthetic material, and are preferably applied by means of 2-component-technique to the surfaces of the cuboid-shaped hollow body. It is also conceivable that the sealing plates are applied to the cuboid-shaped hollow body by means of releasable connection technology, for example snapped or screwed onto said body. Preferably, the cylindrical battery cells are enclosed by the sealing elements of the two sealing plates on the respective circumference of the cell so that they seal completely.

The cuboid-shaped hollow body is preferably integrally made from plastic, for example POM. In order to be able to accommodate as many cylindrical battery cells as possible in the temperature-control device according to the invention, i.e. to ensure an arrangement of the battery cells that is as space-saving as possible, the openings are preferably arranged in the form of a densest circular packing.

In an arrangement in which a cylindrical battery cell is received by each opening, each row of battery cells is arranged offset by half a cell width (½ diameter of the battery cell) to the adjacent row. A minimum distance (S) is provided between the individual cells of a row. This distance and the arrangement as the densest circular packing ensure that the separately temperature-controlled fluid can flow around each battery cell. A flow through the liquid space with the temperature-controlled fluid is thereby ensured.

According to the invention, the cuboid-shaped hollow body, excluding the cell head and the cell bottom, extends over a height h of >20 to <100% of the total height H of the battery system. The height h is to be adapted to the requirements of the temperature management, in particular the cooling performance, and is determined by the balance between thermal requirements and the battery weight, which rises with increasing hollow body height.

The battery system, comprising a plurality of cylindrical battery cells, is temperature-controlled via at least one connection device for supplying and at least one further connection device for discharging a separately temperature-controlled fluid such that the fluid flows around the cell walls of the individual battery cells in the fluid-tight liquid space.

Since the liquid space is sealed at the top, the fluid, in particular the cooling liquid, does not come into contact with electrically sensitive areas of the battery system.

Inhomogeneous aging of individual battery cells within a battery system, by being exposed to different temperatures, causes an accelerated, above-average aging of the battery system, and also a reduced capacity. In a preferred embodiment, therefore, the separately temperature-controlled fluid, in particular the cooling liquid, is actively pumped through the temperature-control device. It can thus reliably be prevented that a battery cell, which is arranged on an outer side of the cuboid-shaped hollow body, is exposed to a different thermal environment than one that is arranged between other battery cells, in particular a centrally located one.

Preferably, the fluid is pumped in circulation via a heating and/or cooling device. In a particularly preferred embodiment, the fluid is pumped in circulation through a plurality of successively arranged temperature-control devices according to the invention and at least one heating and/or cooling device. A cooling liquid such as water is understood in particular as a separately temperature-controlled fluid, which is actively temperature-controlled by a heating and/or cooling device.

A battery pack consisting of several battery systems can be temperature-controlled by a pump device, connecting lines between two or more temperature-control devices and a heating and/or cooling device.

By means of the temperature-control device according to the invention and the separately temperature-controlled fluid, temperature differences between the individual battery cells of 5 to 10 K are not exceeded. In addition, the battery system can be operated in the optimum temperature window, in particular the window predetermined by the battery manufacturers. Optimized power output is achieved by active cooling or heating the individual battery cells by means of the temperature-control device according to the invention, not only within the predetermined operating temperatures but also in a further limited temperature range.

Further features and advantages of the present invention will become apparent to the person skilled in the art from the following description of an embodiment, with reference to the accompanying drawings.

DETAILED DESCRIPTION OF THE PREFERRED EMBODIMENT

Figure 1:
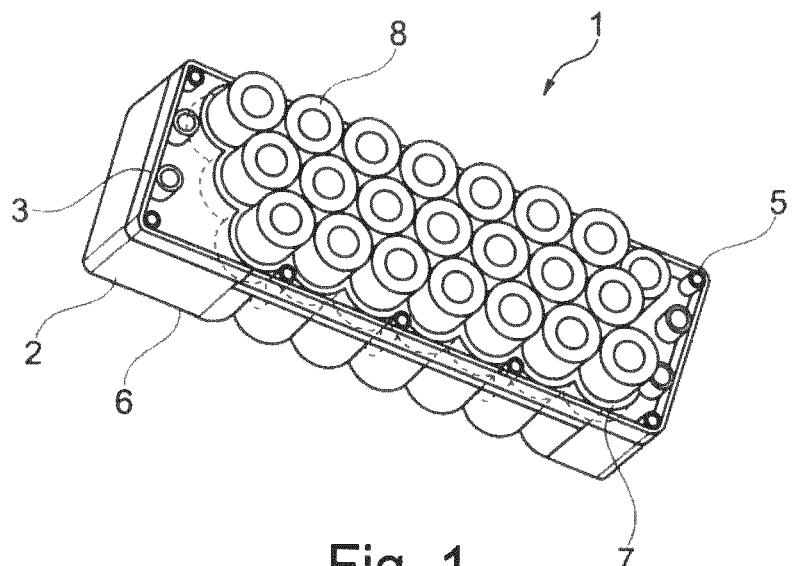
FIG. 1 a temperature-control device for a battery system,
FIG. 2 a sealing plate,
FIG. 3 a cuboid-shaped hollow body viewed from the side and from above and
FIG. 4 a battery pack comprising three temperature-control devices.
Figure 3A:
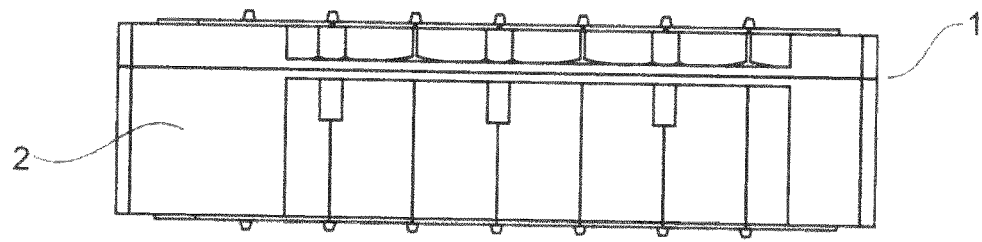

FIG. 1 shows a temperature-control device (1) for a battery system having a cuboid-shaped hollow body (2) with at least one connection device (3) for supplying and at least one connection device (4, see FIG. 4) for discharging a separately temperature-controlled fluid. Cylindrical battery cells (8) are arranged in a plurality of regularly arranged and identically formed openings (7) extending from a first body surface (5) to a second body surface (6, FIG. 3A). The openings (7) or the battery cells (8) are arranged in the form of a densest circle packing.

Figure 2:
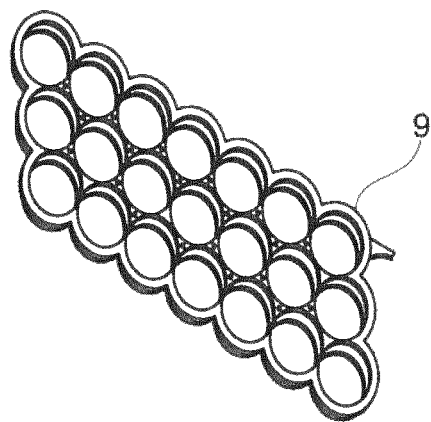

FIG. 2 shows a sealing plate (9) made of an elastomeric, preferably thermoplastic, synthetic material, comprising a plurality of regularly spaced and identically formed openings (7'). In order to ensure a fluid-tight liquid space, the sealing plate (9), preferably by means of 2K technique, is applied to the surfaces (5, 6) of the cuboid-shaped hollow body (2).

Figure 3B:
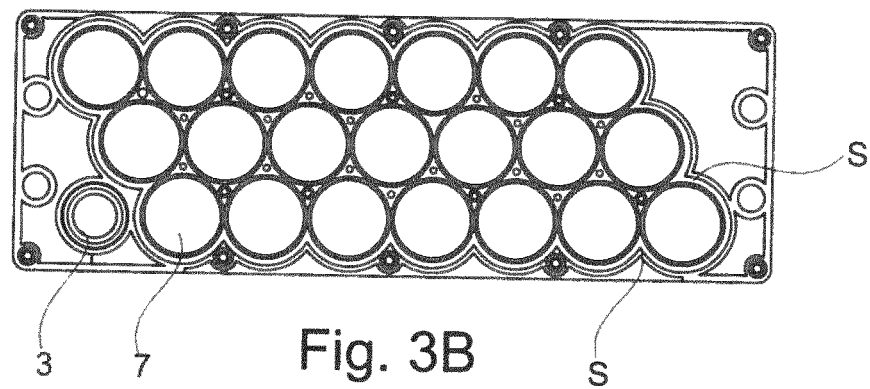

FIG. 3 shows the cuboid-shaped hollow body (2) from the side in a sectional view (3A) and from above (3B), also in a sectional view. Three staggered rows are shown, each with seven openings (7). In each opening (7), a cylindrical battery cell (8) is accommodated in the assembled state, such that each cell has a minimum distance (S) to the neighboring cell. This distance (S) and the arrangement as the densest circular packing ensure that the separately temperature-controlled fluid can flow around each individual battery cell. The fluid is supplied via the connection device (3) to the cuboid-shaped hollow body (2), and leaves it on its underside via the connection device (9).

Figure 4:
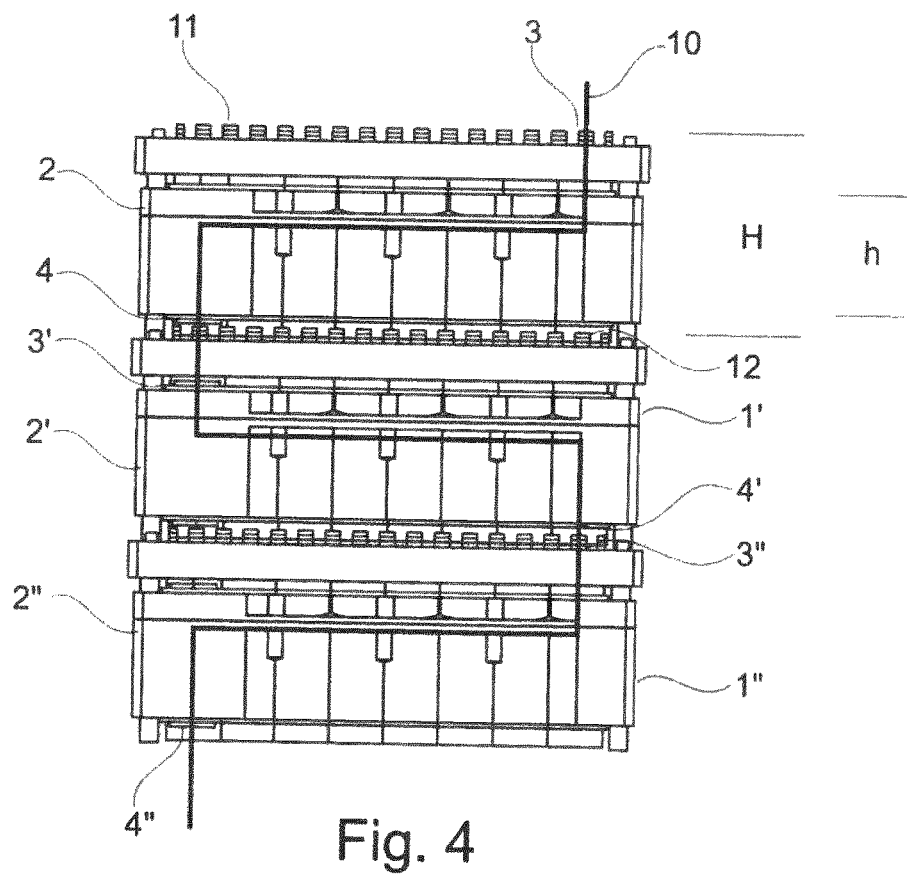

FIG. 4 shows three temperature-control devices (1, 1', 1") connected in series as part of a battery pack, wherein the black line (10) represents the path of the fluid. Via the connection device (3), the fluid flows into the first temperature-control device (1) in order to leave it again via the connection device (9). Subsequently, the fluid flows via the connection device (3') into the second temperature-control device (1'), flows through it and leaves it again via the connection device (9'). This continues for the third and, if appropriate, the following temperature-control device. The hollow body (2) extends over a height h, which is smaller than the total height H of the battery system. The sensitive regions of the battery system, in particular the cell head (11) and the cell bottom (12), are excluded from the temperature-control device (1) according to the invention.

The invention claimed is:
1. A temperature control device for a battery system, said temperature-control device comprising:
a cuboid-shaped hollow body having a liquid space therein with at least one connection device configured to supply a separately temperature-controlled fluid to the liquid space and at least one connection device configured to discharge the separately temperature-controlled fluid, the body having therein a plurality of regularly arranged and identically formed openings extending from a first body surface to a second body surface, wherein each opening accommodates therein a respective cylindrical battery cell in a fluid-tight connection so that the fluid space in the hollow body is fluid-tight, and wherein the hollow body, excluding the cell head and the cell bottom, extends over a height h of >20 to <100% of the total height H of the battery system.

2. A temperature control device for battery cells according to claim 1, wherein each opening has a sealing element that encloses the cylindrical battery cells.

3. A temperature control device for battery cells according to claim 1, wherein the cuboid-shaped hollow body is integrally made from plastic.

4. A temperature control device for battery cells according to claim 1, wherein the openings (are arranged in a densest circular packing form.

5. A temperature control device for battery cells according to claim 1, wherein the individual battery cells are spaced apart from each other.

6. A temperature control device for battery cells according to claim 1, wherein the separately temperature-controlled fluid is pumped in circulation via a heating and/or cooling device.

7. A temperature control device for battery cells claim 1, wherein the fluid is conductive.

8. A temperature control device for battery cells according to claim 1, wherein the cuboid-shaped hollow body is integrally made from POM.

9. A battery pack with temperature-control devices connected in series according to claim 1, wherein the separately temperature-controlled fluid is guided in circulation via temperature-control devices, at least one pumping device, and a heating and/or cooling device.

* * * * *